United States Patent [19]

Noda et al.

[11] Patent Number: 4,540,193
[45] Date of Patent: Sep. 10, 1985

[54] REAR MOTORCYCLE FORK

[75] Inventors: Azusa Noda, Tokyo; Nobuo Fujitaka, Niiza; Masaru Fujisaki, Tokyo, all of Japan

[73] Assignee: Honda Giken Kogyo Kabushiki Kaisha, Tokyo, Japan

[21] Appl. No.: 507,127

[22] Filed: Jun. 23, 1983

[30] Foreign Application Priority Data

Jun. 23, 1982 [JP] Japan .................................. 57-106697

[51] Int. Cl.³ .............................................. B62K 25/04
[52] U.S. Cl. .................................... 280/284; 280/288; 180/219; 180/227
[58] Field of Search ............... 280/284, 285, 286, 288, 280/277, 279; 180/227, 219; 29/526 R, 175 A; 403/76, 77, 157, 361

[56] References Cited

U.S. PATENT DOCUMENTS 3,151,878 10/1964 Uncles .................................. 280/284
4,008,903 2/1977 Ramond .............................. 280/279
4,415,057 11/1983 Yamaguchi ..................... 280/284 X
4,440,413 4/1984 Miyakoshi et al. ................. 280/284

Primary Examiner—Joseph F. Peters, Jr.
Assistant Examiner—Charles R. Watts
Attorney, Agent, or Firm—Armstrong, Nikaido, Marmelstein & Kubovcik

[57] ABSTRACT

A rear fork for a motorcycle having hollow rear arms and metal end pieces for receiving an axle. The rear fork can be made of integrally molded fiber reinforced plastic. The metal end piece conforms to the configuration of the end of the arm and has locating projections which abut the end of the arm. The metal end piece can be inserted into the arm or can externally surround the end of the arm.

6 Claims, 16 Drawing Figures

FIG. 7
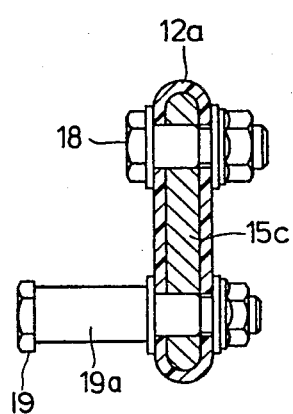
FIG. 8
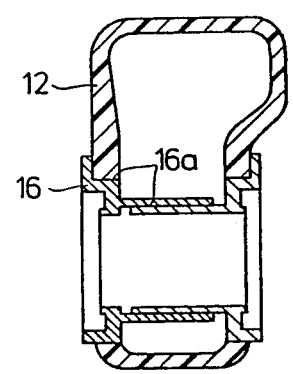
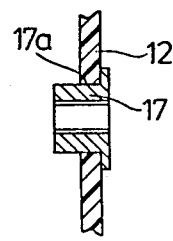
FIG. 9

REAR MOTORCYCLE FORK

BACKGROUND OF THE INVENTION

This invention relates to an assembled construction of the rear fork for a motorcycle.

Most rear forks for motorcycles are assembled by welding together a pair of left and right rear fork arms, a cross member connecting between the pair of rear fork arms, a pivot axle support member and an axle receiving member. However, when the assembling is by a conventional welding method, the weld lengths are long and accurate locating of each member prior to welding is required. This results in a poor working efficiency.

In order to reduce the weight of the vehicle body, many kinds of synthetic resin materials have been adopted recently as body structural members. Generally "fiber reinforced plastic" (hereinafter referred to as "FRP"), such as epoxy resin, polyester resin or the like mixed with carbon fiber, glass fiber or the like, is used as a structural member requiring strength because it is lightweight and excellent in tensile strength.

However, there is a problem that FRP has less compressive strength compared with metal materials and cannot be used directly to form a bearing portion to bear a concentrated load. Therefore, even though the use of FRP as rear fork forming material is effective in reduction of the body weight, consideration must be given to the foregoing problem for determination of the shape and construction.

OBJECTS AND SUMMARY OF THE INVENTION

The first object of this invention is to simplify the assembling construction of an end piece to a rear fork arm for improved assembling workability.

The second object of this invention is to improve the joint strength of an end piece to a rear fork arm.

The third object of this invention is to provide a rear fork structure where the rear fork arm can be formed with FRP, thereby effectuating a reduction of the weight of vehicle body.

The fourth object of this invention is to provide an integrally molded rear fork arm of approximate U shape with high strength and high stiffness so as to have it able to cope with torsional force generated at the axle mount.

The fifth object of this invention is to eliminate conventional processing errors at fitting and joining to improve installed dimensional accuracy as well as to improve workability.

The sixth object of this invention is, when FRP is used as rear fork molding material, to maintain the strength by joining metal mount members to those portions which require strength, such as the bearing pressure parts and bolt tightening parts.

The seventh object of this invention is, by making the join between the pivot pipe and rear fork arm stronger, to improve the strength and stiffness against mechanical forces, such as twisting and bending of the rear fork, and to reduce the weight of rear fork as well.

This invention is characterized by providing an integrally molded rear fork arm with an axle mount member on the rear end and with a pivot pipe on the front end.

This invention is further characterized by fitting to each rear end of a pair of left and right hollow rear fork arms, an axle receiving member of metal (hereinafter referred to as "end piece") provided with locating projections and joining both members to each other.

This invention is still further characterized by the joining a cylindrical pivot pipe firmly to a rear fork arm by forming a closed arc shaped cavity at the front end of a rear fork arm and securing a cylindrical pivot pipe to said cavity.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 7 is a view showing the section along the lines VII—VII in FIG. 2;

FIG. 8 is a view showing the section along the lines VIII—VIII in FIG. 2;

FIG. 9 is a view showing the section along the lines IX—IX in FIG. 2;

DETAILED DESCRIPTION OF PREFERRED EMBODIMENTS

Figure 1:
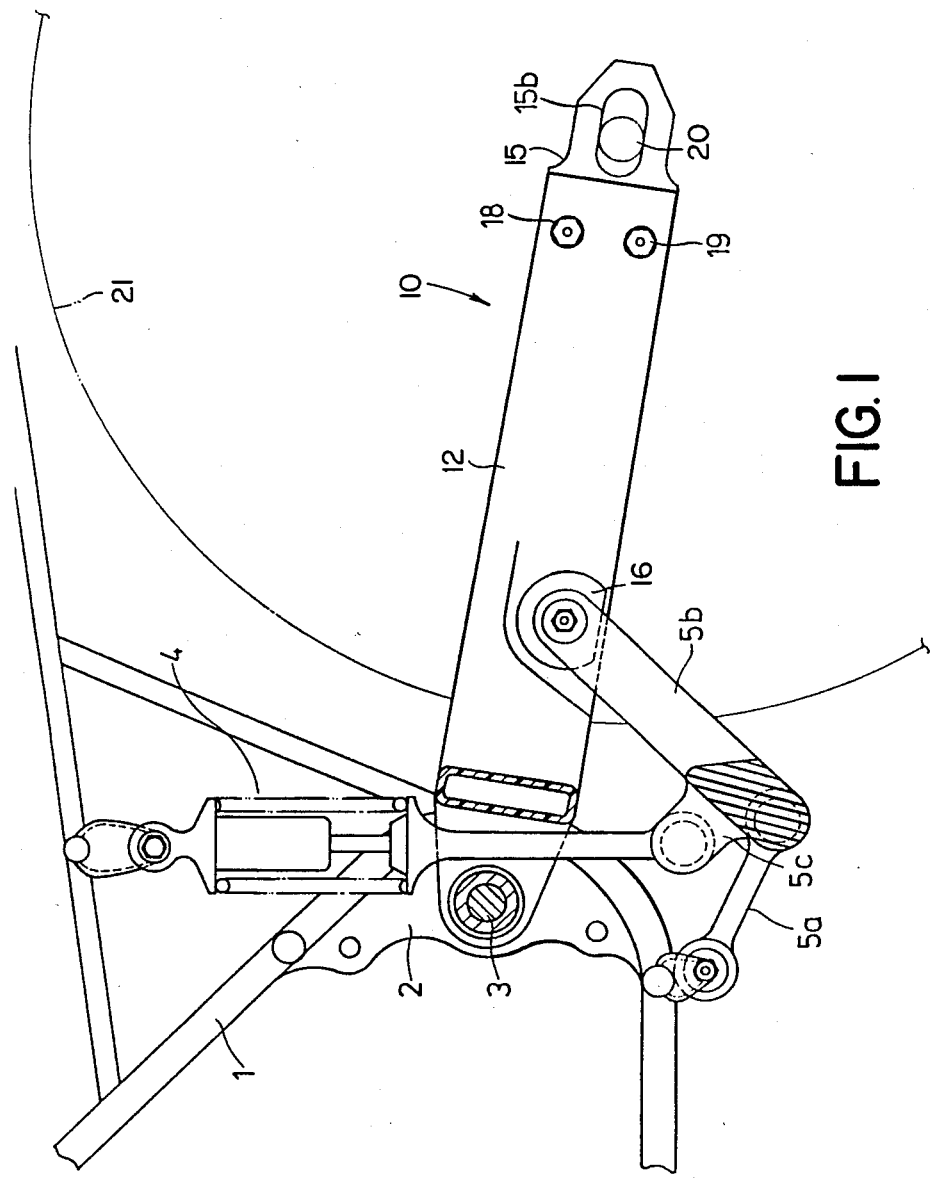
FIG. 1 is a side view showing an important portion of a motorcycle provided with the rear fork in accordance with an embodiment of this invention.

A rear fork 10 of a motorcycle is pivotally tiltably supported by a pivot bolt 3 on a support bracket 2 installed on a body frame 1 of the motorcycle. The rear fork 10 is also pivotally rotatably supported, at a link collar 16 section installed on the approximate middle of each rear fork arm 12, on the open ends of a suspension link 5b of approximate U shape. The suspension link 5b is connected to a pair of suspension links 5a, which are directly pivotally supported by the body frame 1. The link 5b is also connected to a suspension unit 4 through a pair of brackets 5c provided at the approximate middle of the connecting rod portion of the U-shaped suspension link 5b.

A rear wheel axle 20 is pivotally supported by an end piece 15 installed on the rear end of the rear fork arm 12, a rear wheel 21 is pivotally rotatably supported by the rear wheel axle 20 (FIG. 1).

Figure 2:
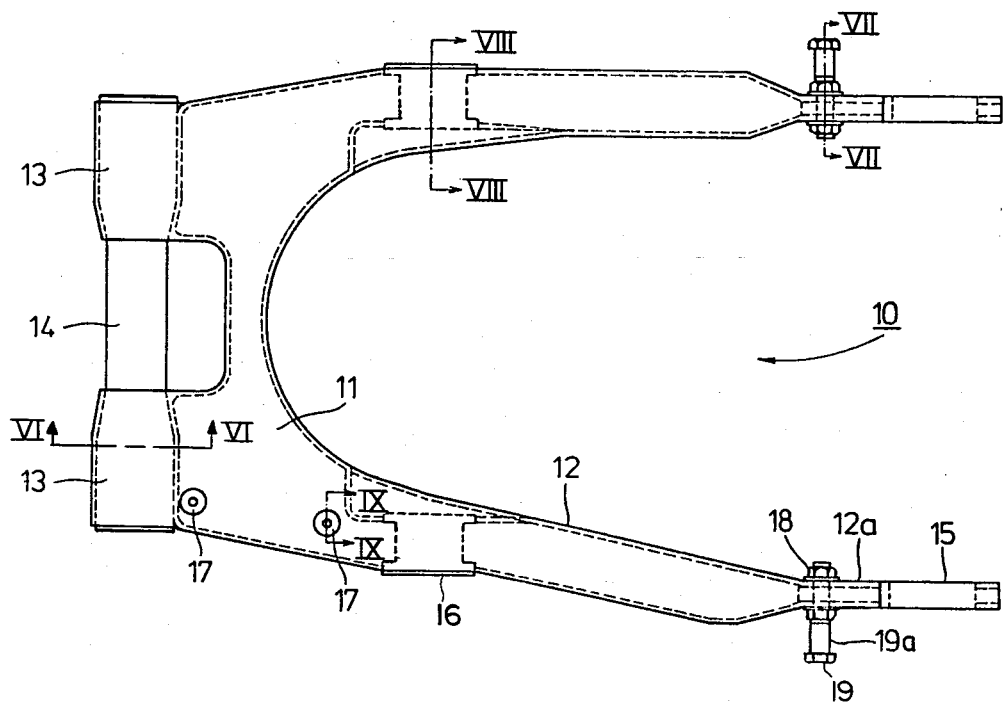
FIG. 2 is a plan view of the same rear fork.
Figure 3:
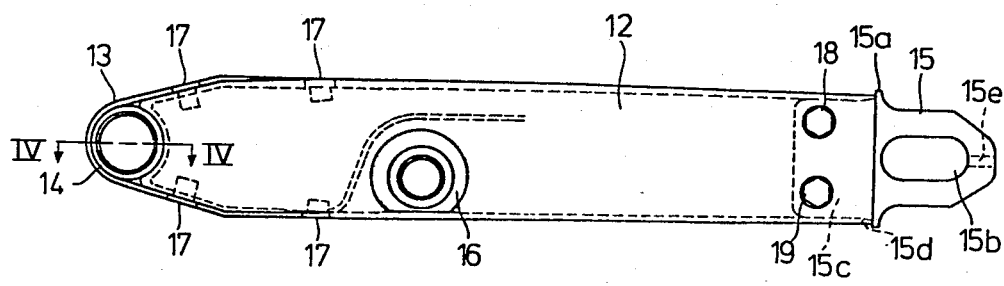
FIG. 3 is a side view of the same.

The rear fork 10 is of approximate U shape as a whole. A pivot pipe 14 is joined to the front end of the rear fork arm 12 and the axle mount member or end piece 15 is joined to the rear end thereof. A link collar 16 for mounting the suspension link arm is provided on the side wall of said rear fork arm 12. Nuts 17 for mounting chain sliders are provided on both upper and lower parts of said rear fork arm 12 (FIGS. 2 and 3).

Figure 4:
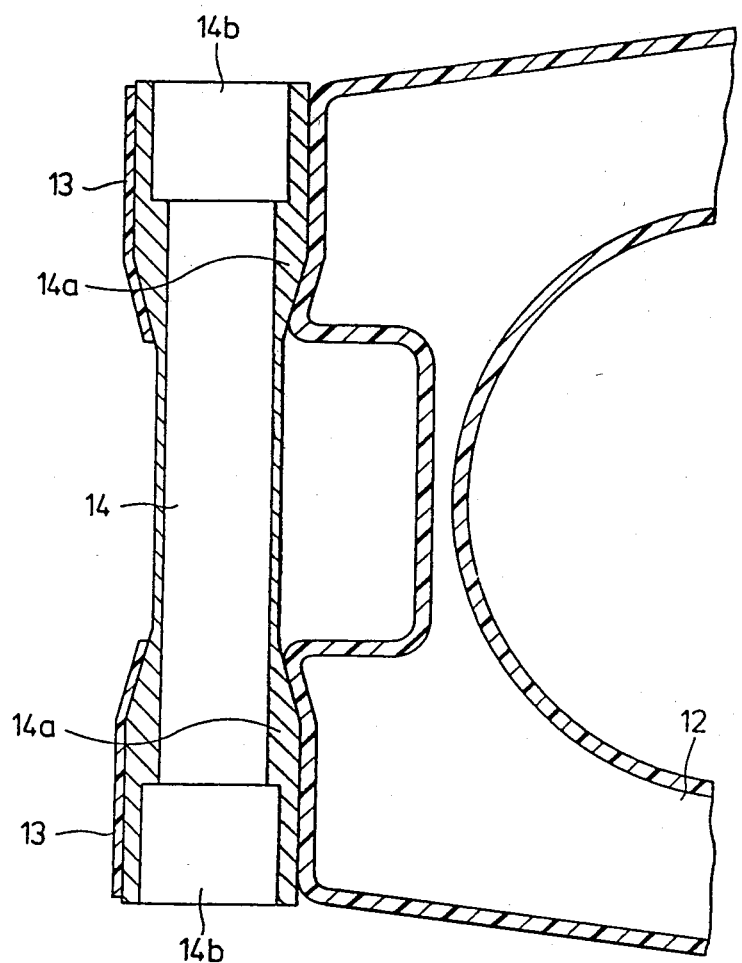
FIG. 4 is a view showing the section along the lines IV—IV in FIG. 3.
Figure 5:
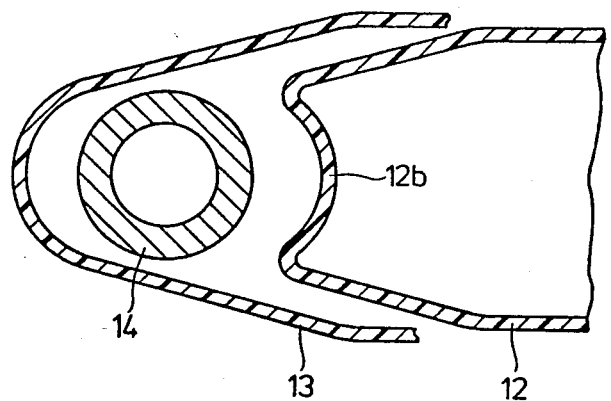
FIG. 5 is an explanatory drawing showing the pivot pipe, the rear fork arm, and the reinforcing plate just prior to assembly.
Figure 6:
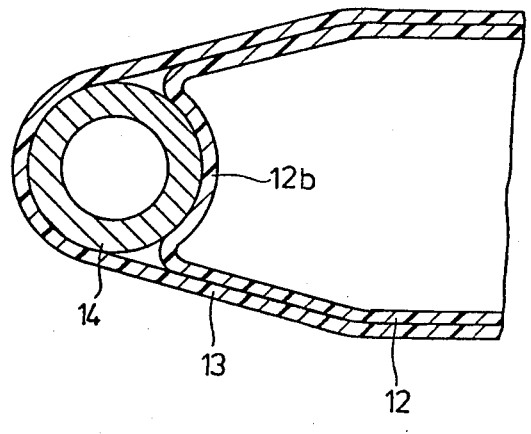
FIG. 6 is a sectional view along the lines VI—VI in FIG. 2 showing the components of FIG. 5 in the assembled condition.

The rear fork is integrally molded of fiber reinforced plastic, forming an arc-shaped closed cavity 12b at the front end, (FIGS. 5 and 6) to which is secured a cylindrical pivot pipe 14 of metal provided on each end with a bearing force-fit portion 14b that has an outer periphery 14a that tapers towards the center of the pivot pipe 14 (FIG. 4). A reinforcing plate 13 made of fiber reinforced plastic is applied with pressure from the front portion of the pivot pipe 14 to the rear fork arm 12 so as to straddle the two ( FIG. 4, 5, 6).

Because the cylindrical pivot pipe is secured to the arc shaped cavity formed at the front end of the rear fork arm, the joint area between the pivot pipe and rear fork arm is made larger and the pivot pipe is held fast vertically for further strengthening of the joint.

Because the reinforcing plate of fiber reinforced plastic is attached with pressure over from the front portion of the pivot pipe to the rear fork arm, the pivot pipe is covered practically all around, which effectuates a great effect for improved joint strength and increased feeling of integrity with the rear fork body.

Furthermore, the pivot block construction of this embodiment has a sufficient strength and stiffness against external mechanical forces, such as twisting and bending of the rear fork, which enables the rear fork body to be made thinner in wall thickness for saving as much weight, resulting in a reduction of the unsprung weight of the rear cushion.

The pivot pipe is made of metal, with each end constituting a bearing force-fit portion. The outer periphery of the bearing force-fit portion is tapered towards the center in the width direction of the vehicle body so that the joint strength against axial lateral thrust load is improved. The outside diameter of the bearing force-fit portion on each end can be changed arbitrarily, allowing a wider freedom in selecting the size and type of end bearings.

This portion of the invention generally concerns a pivot pipe in a rear fork arm which is made of fiber reinforced plastic, yet in the case where the rear fork arm is made of metal, e.g. aluminum, a firm joint can be obtained by forming an arc shaped cavity at the front end of the rear fork arm and welding a cylindrical pivot pipe thereto. In such a case, covering with a reinforcing member is not necessarily required.

The rear end 12a of the rear fork arm 12 can be made flat, into which is fitted an end piece 15 made of metal, having a pair of locating projections 15a and provided with a hole 15b for supporting the rear wheel axle and a bare 15e for a chain adjuster screw. The base end of the fit-in portion 15c of the end piece 15 is tapered into a flare.

The fit-in portion 15c inserted into the rear end 12a is joined with adhesive and fastened securely to the rear end 12a with a reinforcing bolt 18 and a reinforcing bolt 19 with stand stay 19a (see FIGS. 1, 3 and 7).

A link collar 16 made of metal and chain slider nuts 17 made of metal are installed on each rear form arm 12, joined with adhesive (16a, 17a) (see FIGS. 8 and 9).

A chain slider is installed on each chain slider nut 17 so that the main body portion 11 made of plastic will not be hit by the drive chain.

The embodiment shown is composed as described in the foregoing with the rear fork 10 being formed in its main body portion 11 of FRP and with metal members being provided on those portions where pressure resisting strength is required, so that it is not only lightweight, but it also has a sufficient strength and stiffness as a rear fork.

For assembling each metal member, such as the pivot pipe 14, end piece 15, link collar 16 and chain slider nut 17, to the rear fork main body portion 11 adhesive of epoxy resin or the like is used, so that special skill is not required and the assembly can be performed efficiently.

Especially, in installing the end piece 15, its fit-in portion 15c to which adhesive is applied is merely inserted into the rear end 12a of the rear fork arm 12. Proper positioning is ensured by the locating projections 15a, so the work is easy. In addition, when positioning is made with the locating projections 15a, positional relationship between the left and right end pieces 15 is always proper, enabling an accurate and simple installation of the rear wheel axle 20.

The base end of the fit-in portion 15c and the distal end of the rear end portion 12a of the rear form arm 12 to fit thereon have corresponding tapered portions 15d so that in inserting the fit-in portion 15c, adhesive is not scraped off which makes the operation easy. In addition, a tapered joint is less in the shearing load it takes upon itself as compared with a joint in parallel with the direction of insertion which improves adhesive strength.

Furthermore, by a provision of locating projections, the chain stretching load is dispersed uniformly over the entire end of the rear fork rear end portion 12a to improve the pressure resisting strength of the joint. When the locating projections are of such shape as to agree with or to project beyond the external shape of the rear end 12a, the before mentioned operative effect is obtainable.

Because the stand stay 19a is provided on a bolt 19 that reinforces and joins between the rear fork rear end 12a and the end piece fit-in portion 15c, it is not necessary to install a separate stand stay which yields reduction in the number of manhours for the process and assembly. Furthermore, because it is made of metal, unlike plastic material, the stand stay 19a can readily be repaired even if it is damaged.

The metal end piece may be formed in such shapes other than the before mentioned embodiment as those shown in FIGS. 10 to 12, and FIGS. 13 and 14.

Figure 10:
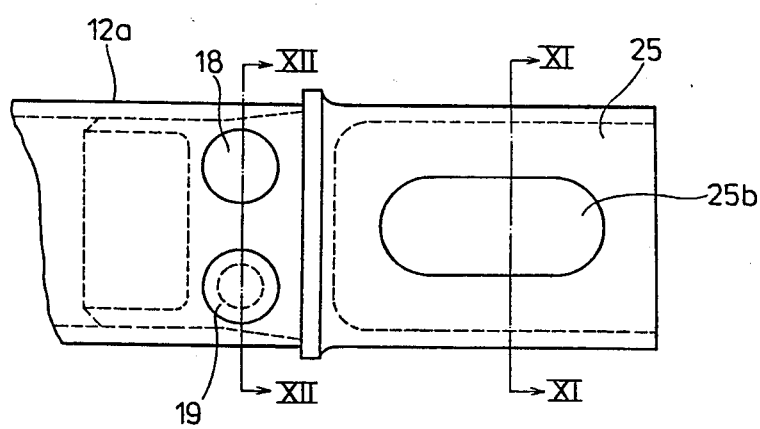
FIG. 10 is a view showing an important portion of the rear fork arm in accordance with a second embodiment of the end piece of this invention.
Figure 11:
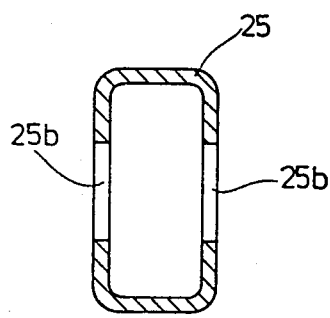
FIG. 11 is a view showing the section along the lines XI—XI in FIG. 10.
Figure 12:
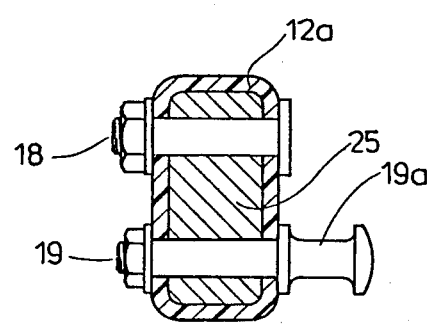
FIG. 12 is a view showing the section along the lines XII—XII in FIG. 10.

In an end piece 25 shown in FIGS. 10 to 12, the rear wheel axle tightening portion is formed with a cylindrical body having a rectangular section, where a rear wheel axle support 25b is provided. By forming the rear wheel axle tightening portion into such a cylindrical shape, its stiffness and strength against bending moment is improved.

Figure 13:
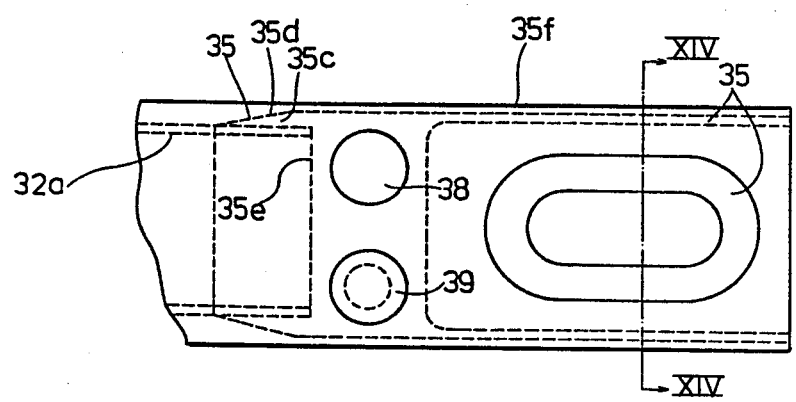
FIG. 13 is a view showing an important portion of the rear fork arm in accordance with a third embodiment of the end piece of this invention.
Figure 14:
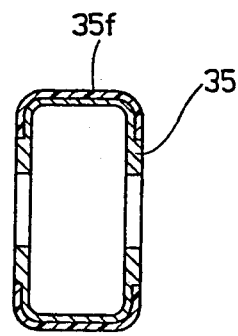
FIG. 14 is a view showing the section along the lines XIV—XIV in FIG. 13.

In an end piece 35 shown in FIGS. 13 and 14, the rear wheel axle tightening portion is also formed with a cylindrical body having a rectangular section, the insertion portion 35c at the front end is formed into a shape to insert over the rear fork arm rear end 32a, and the external shape of the fit-on portion 35c has a tapered portion.

In assembling the end piece 35, adhesive is applied to the internal surface of the fit-on portion 35c or the external surface of the rear end 32a. The fit-on portion 35c is fitted to the rear end 32a until the internal bottom wall 35c of the fit-on portion 35c abuts on the distal end of the rear end portion 32a. Then, the rear fork arm and the end piece are covered with a layer of FRP, which is left to harden to constitute an outer cover 35f. Later on, the outer cover 35f and end piece 35 are reinforced with reinforcing bolts 38, 39 which are tightened.

By virtue of such construction, the chain stretching load is uniformly dispersed by the end piece bottom wall 35e over the rear fork rear end 12a. The fit-on portion 35c is joined at both internal and external surface to the rear fork arm, and furthermore, because of its being tapered (35d) at the external surface, the joint strength thereof is very great.

Figure 15:
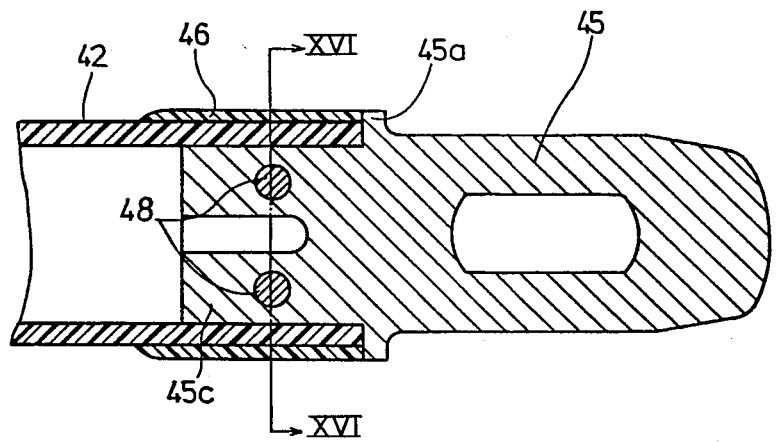
FIG. 15 is a side view showing the longitudinal section of the rear fork arm in accordance with a fourth embodiment of the end piece of this invention.
Figure 16:
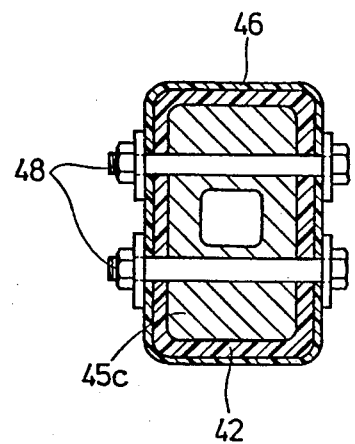
FIG. 16 is a view showing the section along the lines XVI—XVI in FIG. 15.

The joint construction of yet another embodiment end piece may be made as shown in FIGS. 15 and 16.

That is, the inside dimensions of the rear end fit-on portion of a rear fork arm 42 are finished to have a clearance of 0 to 50μ over the outside dimensions of the fit-in portion 45c of a metal end piece 45. Both members are processed for adhesion, then they are joined to each other. Next, the rear end periphery of the rear fork arm 42 is covered with FRP reinforcing layer 46, and allowed to harden. The end piece 45, rear fork arm 42, FRP reinforcing layer 46 are reinforced and tightened with bolts and nuts 48.

In such construction, because the locating projections 45a of the end piece 45 abut on the rear end of the rear fork arm 42 and the rear end of the FRP reinforcing layer 46, the dispersion effect of the chain stretching load is great. Because of the FRP reinforcing layer 46, the rear end portion of the rear fork arm 42 is effectively reinforced and stiffened.

In each of the embodiments of the end piece described above, the rear fork arm is formed with FRP, but it may be made of metal, in which case it is possible for all of the members to be assembled by welding or brazing, in addition to joining with adhesive. As for the end piece, it may be joined simply with bolts.

As is clear from the foregoing description, this invention relates to the joint between the rear fork and pivot pipe of motorcycles, where the front end of the rear fork arm is formed into an arc shaped cavity and a cylindrical pivot pipe is secured to said cavity, so that a firm joint is effectuated between the pivot pipe and rear fork arm, especially in the case of a rear fork made of fiber reinforced plastic. This can lead to a further weight reduction of the rear fork through improved strength and stiffness against external mechanical forces, such as twisting and bending of the rear fork.

As is clear from the foregoing description of the embodiments of the end piece, this invention can be characterized by providing an integrally molded rear fork arm of approximate U shape with a metal end piece on the rear end and with a metal pivot pipe on the front end, thereby providing it, because of its being formed by integral molding, with strength and stiffness sufficient to cope with torsional force generating at the axle mount, irrespective of material used for the rear fork body.

Also, because of its being an integrally molded rear fork, conventional processing errors at fitting and joining are eliminated for improvements in the installed dimensional accuracy of end piece and pivot pipe as well as improved workability.

Furthermore, forming the bolt tightening parts and bearing pressure parts, such as the end piece, pivot pipe and others, with metal enables molding of the rear fork with FRP, which effecuates weight saving in the rear fork to result in a reduction of the unspring weight.

As is clear from the foregoing description of each particular embodiment of the end pieces, the invention is of construction where an end piece provided with locating projections is inserted into or over the rear end of a pair of left and right hollow rear fork arms for joining them to each other, so that in the assembly, an accurate positioning is performed only by inserting the end piece until the locating projections abut on the rear end of the rear fork arm. In this manner, positional relationship between the left and right end pieces is always proper. Therefore, it is also possible for installation of the rear wheel axle on the end pieces to be performed accurately and easily.

Because the locating projections are of such shape as to agree with or to project beyond the external shape of the rear fork arm rear end, the chain stretching load transmitted from the end piece to the rear fork arm rear end is uniformly dispersed over the rear fork rear end to improve the strength of the joint.

Furthermore, the use of the metal end piece enables the rear fork arm to be formed with FRP for reduction of the weight of rear fork, which results in a reduction of the unspring weight.

Furthermore, the operation to fit and join the end piece to the hollow rear fork arm is simple, contributing to improved productivity.

It is readily apparent that the above-described rear motorcycle fork meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A rear fork for a motorcycle having a front end for attachment to a motorcycle and rear ends for mounting a wheel and being of approximate U-shape having rear fork arms characterized in that the rear fork arms are hollow and are formed of integrally molded fiber reinforced plastic and in that a metal end piece for receiving an axle is provided to each of said rear fork arms, said metal end piece having a configuration conforming to an end portion of the rear fork arm and locating projections abutting a portion of said end portion, said metal end piece being joined to an end portion of said rear fork arm.

2. A rear fork as claimed in claim 1, characterized in that a portion of each said metal end piece is inserted into said hollow rear fork arm.

3. A rear fork as claimed in claim 1, characterized in that a portion of each said metal end piece externally surrounds and is shaped to said hollow rear fork arm.

4. A rear fork as claimed in claim 1, characterized in that a cylindrical pivot pipe is secured to an arc shaped cavity formed at said front end of said rear fork.

5. A rear fork as claimed in claim 4, characterized in that the pivot pipe is covered with a reinforcing member from a front portion of the pivot pipe to the rear fork so as to straddle over both.

6. A rear fork as claimed is claim 4, characterized in that the pivot pipe is metal having ends, each end constituting a bearing force-fit portion.

* * * * *